INVENTOR.
ROLF BIELEFELD
BY Hobbs & Easton
ATTORNEYS

Nov. 15, 1966  R. BIELEFELD  3,285,285

VALVE

Filed Feb. 27, 1964  2 Sheets-Sheet 2

INVENTOR.
ROLF BIELEFELD
BY Hobbs & Easton
ATTORNEYS

United States Patent Office 3,285,285
Patented Nov. 15, 1966

3,285,285
VALVE
Rolf Bielefeld, St. Joseph, Mich., assignor to Koontz-Wagner Electric Company, Inc., South Bend, Ind., a corporation of Indiana
Filed Feb. 27, 1964, Ser. No. 347,870
8 Claims. (Cl. 137—625.65)

The present invention relates to valves and more particularly to magnetically operated valves.

The conventional magnetically operated valves usually consist in effect of a separate valve unit and a separate solenoid unit operatively connected to one another by a stem or linkage interposed between the solenoid plunger and valve element. The solenoid and valve units are often mounted in a single housing and form a single assembly which can be installed in a hydraulic system as a unit. This type of valve structure is relatively bulky and heavy, and hence is limited in its application in complicated, compact and confined hydraulic systems, particularly for high pressure applications. Efforts have been made in the past to overcome these disadvantages by making a composite magnetic valve in which the valve element and solenoid plunger are combined, thus in effect eliminating one of the elements and the interconnecting stem or linkage. Difficulty has been encountered in this type of valve structure in that the prior structures have not been able effectively to handle fluid under high pressure without the size of the combined unit being increased to a point where there is little advantage in size and weight over the conventional solenoid valve. It is therefore one of the primary objects of the present invention to provide a compact, relatively simple, composite solenoid valve which can effectively handle fluid under a wide range of pressures, and which forms a positive seal between the valve element and the seat.

Another object of the present invention is to provide a poppet valve structure in which the valve element forms a solenoid plunger and in one position controls the flow of fluid to one valve outlet and in the other position controls the flow to another outlet, and in which the valve element is substantially fully balanced so that a relatively light solenoid can be used effectively to operate the valve element.

Still another object of the invention is to provide a solenoid valve in which the valve element is operated by direct, magnetic action without involving any stems or linkages interconnecting the solenoid and valve parts, and which can handle and effectively control large volumes of fluid without the use of pilot valves or large bulky coils and springs.

Another object is to provide a solenoid valve of the aforesaid type which is so constructed and arranged that the operating parts can be made and used over long periods of time without initially maintaining close tolerances during fabrication and without undue wear taking place during the operation of the valve.

Another object of the invention is to provide a solenoid valve structure having a combination valve element and plunger, which can be adapted to either a two-way or a three-way valve type with relatively little change in the basic valve structure or elements, and which has relatively few and simple and easily assembled moving parts and elements.

Additional objects and advantages of the present invention will become apparent from the following description and accompanying drawings, wherein.

Figure 1:
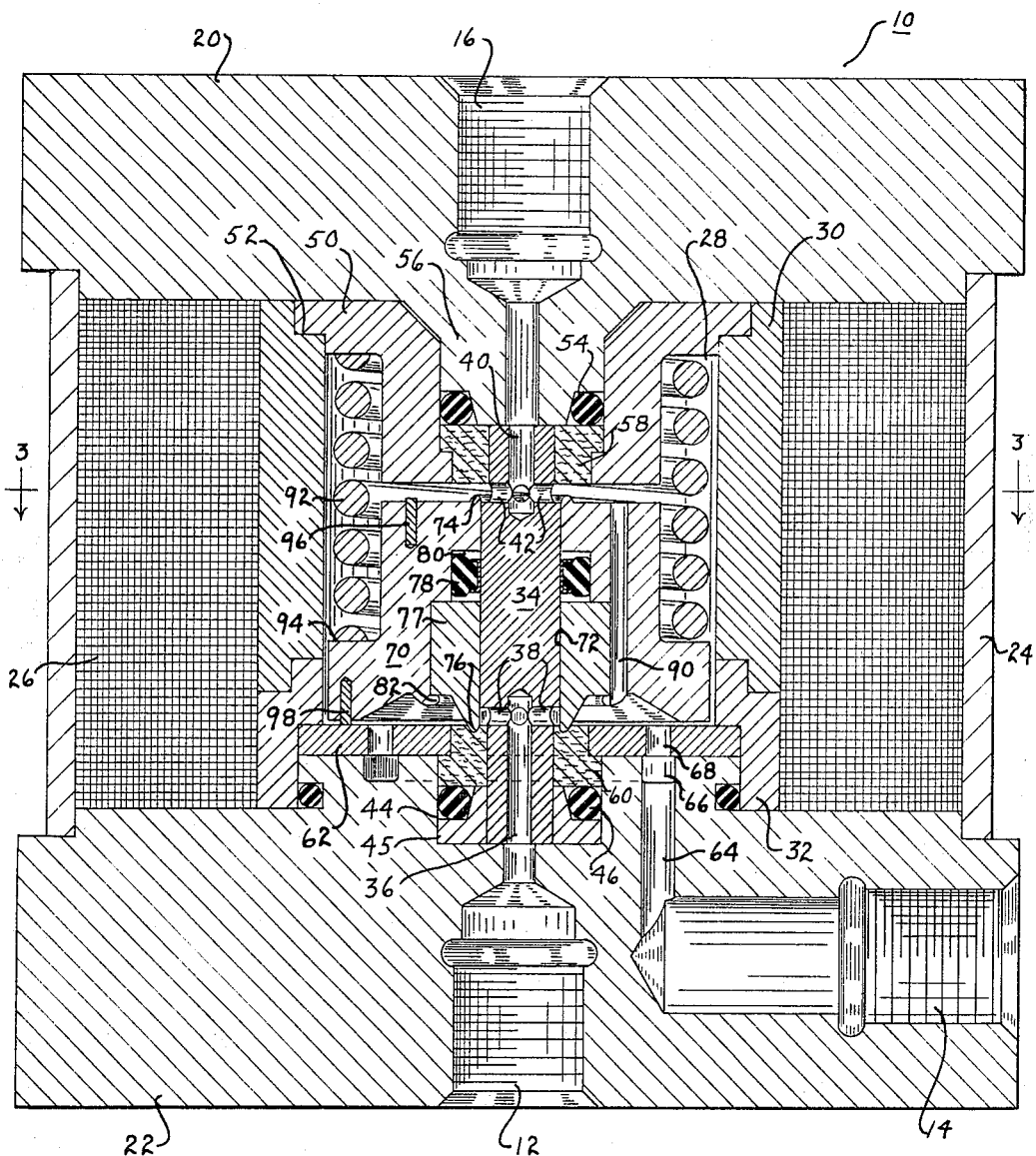
FIGURE 1 is a vertical cross sectional view through the center of the present valve element showing the valve element in one operating position, namely when the solenoid is de-energized, the section being taken on line 1—1 of FIGURE 3.

Referring more specifically to the drawings, numeral 10 designates generally the present solenoid valve having fluid inlet passage 12 for receiving hydraulic fluid from a pump, fluid outlet passage 14 for delivering fluid from the pump to a hydraulic cylinder or other device operated by the fluid, and an outlet passage 16 connected to a sump or tank from which the pump receives its fluid. The foregoing pump, hydraulic cylinder or motor and sump are not shown, since those devices are conventional and are adapted to operate in the normal manner in conjunction with the present valve 10. While the present description is directed to the valve in which passage 12 is an inlet and passages 14 and 16 are outlets, the valve will operate satisfactorily with the inlets and outlets interchanged.

The valve body consists of pole and front end plates 20 and 22, respectively, of magnetic material separated by a shroud 24 of magnetic material, these three parts being held rigidly together by a plurality of bolts (not shown) extending through holes in flanges on the periphery of the two end plates 20 and 22. A solenoid coil 26 of conventional construction is mounted within shroud 24 between end plates 20 and 22, and is separated from valve chamber 28 by a cylinder 30 of non-magnetic material and a ring-shaped front piece 32 of magnetic material, cylinder 30 and the ring-shaped front piece 32 forming a fluid-tight seal with one another and with end plates 20 and 22.

A stationary shaft 34 is rigidly mounted between the two end plates 20 and 22, and in one end contains axial passage 36 and radial passages 38 connecting inlet passage 12 with valve chamber 28, and in the other end contains an axial passage 40 and radial passages 42 connecting outlet passage 16 with valve chamber 28. The shaft seats in a recess 44 and is retained in alignment with inlet 12 by a spacer 45 sealed to end plate 22 by an O-ring 46. A pole piece 50 of magnetic material is mounted in chamber 28 and is held in place by shoulder 52 on the corresponding end of cylinder 30, the pole piece being held in fluid-tight relation with end plate 20 by an O-ring 54. The inner end of pole piece 50 surrounds annular protrusion 56 on pole end plate 20 and extends beyond the end thereof to form a recess for receiving a resilient annularly-shaped valve seat 58. A similar valve seat 60 is seated in recess 44 in front end plate 22 and is surrounded by a retainer plate 62 of non-magnetic material. Passage 14 is connected to valve chamber 28 by a passage 64 extending from the inner end of passage 14 to an annular channel 66 and by a plurality of ports 68 in retainer plate 62.

A valve element 70, which forms the plunger for the solenoid, is an annular-shaped member with an axially disposed hole 72 for receiving shaft 34 and is adapted to reciprocate on shaft 34 to and from valve seats 58 and 60, the element being provided with an annular lip 74 at its upper end for engaging valve seat 58 and a lip 76 for engaging seat 60. The valve element 70 contains a separate inner ring 77 on which annular lip 76 is disposed, in order to permit a gasket 78 to be inserted in annular chamber 80, the insert 77 being retained in place by a rib 82 on the lower end of the valve element. The gasket engages the shaft 34 and element 70 and forms an effective seal between the shaft and the inner wall of the element.

Figure 2:
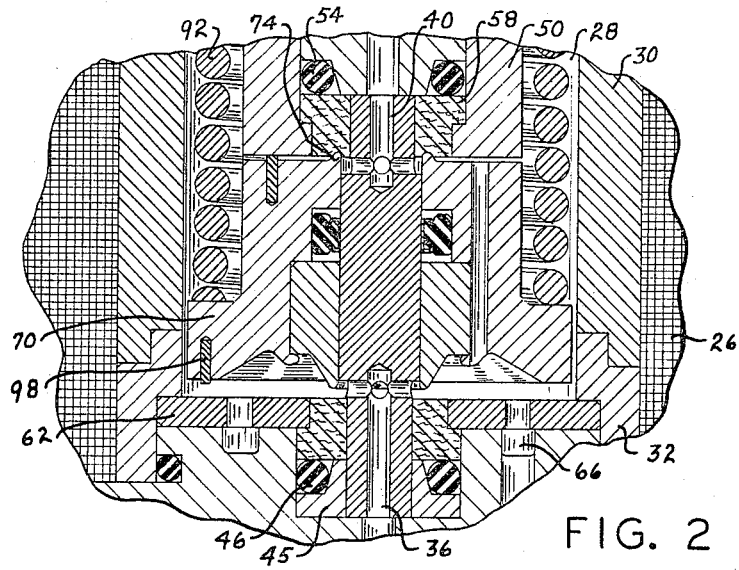
FIGURE 2 is a fragmentary vertical cross sectional view taken on the same plane as FIGURE 1 and showing the valve element in another operating position, namely when the solenoid is energized.
Figure 3:
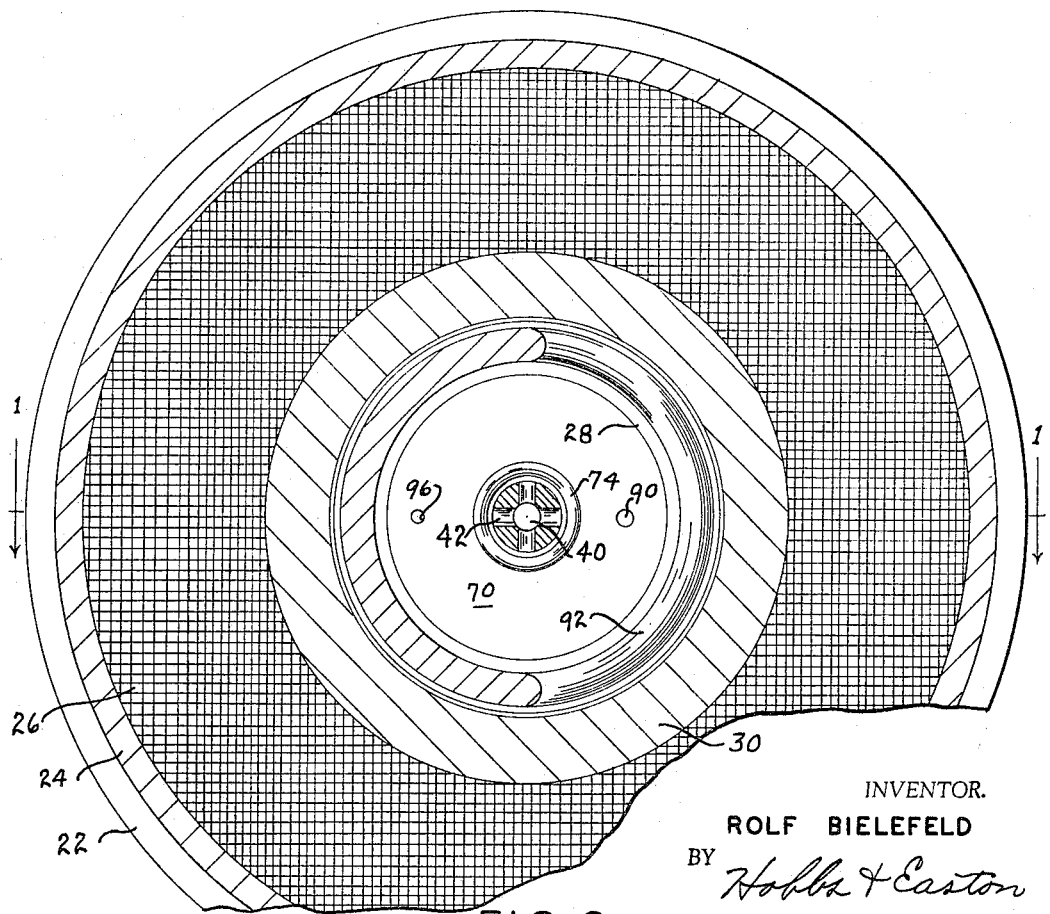
FIGURE 3 is a horizontal cross sectional view of the present valve, the section being taken on line 3—3 of FIGURE 1.

The valve element contains one or more fluid passages 90 extending longitudinally therethrough to permit the fluid to flow from one side of the valve element to the other, thus permitting the fluid to flow from passage 14 to passage 16 when the valve element is in the position shown in FIGURE 1. The valve element is urged to the position shown in FIGURE 1 with lip 76 engaging seat 60 by a coil spring 92 reacting between the pole piece and an annular shoulder 94 on element 70. It is seen from the foregoing description that valve element 70 at the opposite ends, i.e. the upper and lower ends, as viewed in FIGURES 1 and 2, externally of the respective lips 74 and 76, is subjected to the same pressures in chamber 28, and since the areas of the two ends of the valve element are the same, the only differential in pressure between the two ends consists merely of the pressure on the portion of lip 74 or 76 engaging the resilient valve seat. Consequently, element 70 is substantially balanced at all times during the operation of the valve.

The upper and lower ends of element 70 contain stop pins 96 and 98, respectively, which project a short distance beyond the respective end of the element. The upper pin prevents the upper end of the element from seating on the adjacent end of pole piece 50 and pin 98 prevents the lower end from seating against retainer plate 62, thereby maintaining effective chamber pressure on the ends of the valve element when either lip 74 or 76 is engaging and compressed into its respective resilient seat 58 or 60.

In the operation of the present solenoid valve with inlet passage 12 connected to a pump, passage 14 connected to a hydraulic cylinder or other motor, and outlet passage 16 connected to a sump or supply tank, valve element 70 is urged downwardly, as viewed in the drawings, by spring 92, thus seating lip 76 on valve seat 60. With the valve element in this position, no fluid flows from passage 12 to passage 14, and any fluid in the cylinder is discharged through passages 14 and 64, valve chamber 28, passage 90, passages 42 and 40, and outlet passage 16, thus permitting the fluid to drain from the cylinder to the supply tank. When solenoid 26 is energized, a magnetic circuit is created through the coil, end plate 22, front piece 32, valve element 70, pole piece 50 and end plate 20, thus causing valve element 70 to move from the position shown in FIGURE 1 to the position shown in FIGURE 2. In this latter position, annular lip 74 firmly engages valve seat 58 and seats firmly thereon in fluid-tight relation. The fluid now flows from the pump through inlet passage 12, passages 36 and 38, valve chamber 28, ports 68, passages 66, 64 and 14 to the hydraulic cylinder. The foregoing passages remain open as long as coil 26 is energized, and as soon as coil 26 is de-energized, spring 92 returns valve element 70 from the position shown in FIGURE 2 to the position shown in FIGURE 1, thus closing passage 12 and opening passage 16 to permit fluid to flow from the cylinder through passage 14, valve chamber 28 and passage 16 to the supply tank.

While the description has been directed to a three-way valve, the present invention can effectively be used in the construction of a two-way valve by merely eliminating passages 14 or 16 and the respective passages connecting passages 14 and 16 to chamber 28 and omitting the respective sealing elements. Only one embodiment of the present invention has been described in detail herein; however, various changes and modifications may be made without departing from the scope of the invention.

I claim:

1. A three-way solenoid valve, comprising two end plates with fluid passages therethrough parallel to and in alignment with one another, a coil between said end plates, a shroud between said end plates surrounding said coil, a hollow cylinder of non-magnetic material within said coil and forming a valve chamber, a shaft means extending through said chamber from one end plate to the other, each end of said shaft having a passage connecting the passage in the respective end plate with said chamber, an annular valve seat of resilient material around each end of said shaft adjacent the respective end plate, an annular valve element mounted on said shaft and operable in one direction by energization of said coil for axial movement to and from said valve seats, an annular lip on each end of said element for seating on said valve seats, passage means through said element connecting the chamber at opposite ends of said element whereby the opposite ends of said element are subjected to substantially the same fluid pressures, a coil spring around said shaft operatively connected to said valve element for moving said element in the direction opposite to the action of said coil on said element, an annular recess in one of said end plates, a retainer plate between said chamber and said recess having a plurality of ports therethrough, and a passage connected to said recess and extending through the respective end plate.

2. A solenoid valve, comprising two end plates with fluid passages therethrough parallel to and in alignment with one another, a coil between said end plates, a hollow cylinder of non-magnetic material within said coil and forming a valve chamber, a shaft means extending through said chamber from one end plate to the other, each end of said shaft having a passage connecting the passage in the respective end plate with said chamber, an annular valve seat of resilient material around each end of said shaft adjacent the respective end plate, an annular valve element mounted on said shaft and operable by energization of said coil for axial movement to and from said valve seats, an annular lip on each end of said element for seating on said valve seats, passage means through said element connecting the chamber at opposite ends of said element whereby the opposite ends of said element are subjected to substantially the same fluid pressures, a coil spring around said shaft operatively connected to said valve element for moving said element in the direction opposite to the action of said coil on said element, and a passage connected to said chamber laterally from said shaft and extending through one of said end plates.

3. A solenoid valve comprising two end plates with fluid passages therethrough, a coil between said end plates, a hollow cylinder of non-magnetic material within said coil and forming a valve chamber, a shaft means extending through said chamber from one end plate to the other, each end of said shaft having a passage connecting the passage in the respective end plate with said chamber, an annular valve seat around each end of said shaft adjacent the respective end plate, a valve element mounted on said shaft and operable by energization of said coil for axial movement to and from said valve seats, a means on each end of said element for seating on said valve seats, passage means connecting the chamber at opposite ends of said element whereby the opposite ends of said element are subjected to substantially the same fluid pressures, a coil spring around said shaft operatively connected to said valve element for moving said element in the direction opposite to the action of said coil on said element, an annular recess in one of said end plates, a retainer plate between said chamber and said recess having a plurality of ports therethrough, and a passage connected to said recess and extending through the respective end plate.

4. A solenoid valve, comprising two end plates with fluid passages therethrough, a coil between said end plates, a hollow cylinder of non-magnetic material within said coil and forming a valve chamber, a shaft means extending through said chamber from one end plate to the other, each end of said shaft having a passage connecting the passage in the respective end plate with said chamber, an annular valve seat around each end of said shaft adjacent the respective end plate, a valve element mounted on said shaft and operable by energization of said coil for axial movement to and from said valve seats, a means on each end of said element for seating on said valve seats, passage means connecting the chamber at opposite ends of said element whereby the opposite ends of said element are subjected to substantially the same fluid pressures, resilient means operatively connected to said valve element for moving said element in the direction opposite to the action of said coil on said element, and a passage connected to said chamber laterally from said shaft and extending through one of said end plates.

5. A solenoid valve, comprising two end plates, a fluid passage through one of said plates, a coil between said end plates, a shroud between said end plates surrounding said coil, a hollow cylinder of non-magnetic material within said coil and forming a valve chamber, a shaft means extending through said chamber from one end plate to the other, said shaft having a passage connecting the passage in the respective end plate with said chamber, an annular valve seat of resilient material around said shaft adjacent the passage in the respective end plate, an annular valve element mounted on said shaft and operable by energization of said coil for axial movement relative to said valve seat, a means on one end of said element for seating on said valve seat, passage means through said element connecting the chamber at opposite ends of said element whereby the opposite ends of said element are subjected to substantially the same fluid pressures, a coil spring around said shaft operatively connected to said valve element for moving said element in the direction opposite to the action of said coil on said element, an annular recess in one of said end plates, a retainer plate between said chamber and said recess having a plurality of ports therethrough, and a passage connected to said recess and extending through the respective end plate.

6. A solenoid valve, comprising two end plates with a fluid passage through one of said plates, a coil between said end plates, a hollow cylinder of non-magnetic material within said coil and forming a valve chamber, a shaft means in said chamber, said shaft having a passage connecting the passage in the respective end plate with said chamber, an annular valve seat of resilient material around said shaft adjacent the passage in the respective end plate, an annular valve element mounted on said shaft and operable by energization of said coil for axial movement relative to said valve seat, a means on one end of said element for seating on said valve seat, passage means connecting the chamber at opposite ends of said element whereby the opposite ends of said element are subjected to substantially the same fluid pressures, resilient means operatively connected to said valve element for moving said element in the direction opposite to the action of said coil on said element, and a passage connected to said chamber and extending through one of said end plates.

7. A solenoid valve, comprising two end plates with fluid passages therethrough, a coil between said end plates, a hollow cylinder of non-magnetic material within said coil and forming a valve chamber, a shaft means extending through said chamber from one end plate to the other, each end of said shaft having a passage connecting the passage in the respective end plate with said chamber, an annular valve seat around each end of said shaft adjacent the respective end plate, a valve element mounted on said shaft for axial movement to and from said valve seats, a means on each end of said element for seating on the respective valve seat, resilient means operatively connected to said valve element for moving said element in the direction opposite to the action of said coil on said element, and a passage connected to said chamber and extending through one of said end plates.

8. A solenoid valve, comprising two end plates with a fluid passage through one of said plates, a coil between said end plates, a hollow cylinder of non-magnetic material within said coil and forming a valve chamber, a shaft means in said chamber having a passage connecting the passage in the respective end plate with said chamber, an annular valve seat of resilient material around said shaft adjacent the passage in the respective end plate, an annular valve element mounted on said shaft within said coil for axial movement relative to said valve seat, means defining a passage connecting said chamber on opposite ends of said valve element, a means on one end of said element for seating on said valve seat, and a resilient means operatively connected to said valve element for moving said element in the direction opposite to the action of said coil on said element.

References Cited by the Examiner

UNITED STATES PATENTS

| | | | |
|---|---|---|---|
| 1,914,123 | 6/1933 | Hapgood | 251—141 X |
| 2,261,562 | 11/1941 | Ray | 251—141 X |
| 3,126,915 | 3/1964 | Hunt | 137—625.5 |
| 3,185,177 | 5/1965 | Brandenberg et al. | 137—625.27 |

M. CARY NELSON, *Primary Examiner.*

HENRY T. KLINKSIEK, *Examiner.*